United States Patent [19]

Minka

[11] 4,106,809
[45] Aug. 15, 1978

[54] CONVERTIBLE SEAT OF A VEHICLE

[76] Inventor: Karlis Minka, 204 E. Joppa Rd., Towson, Md. 21204

[21] Appl. No.: 819,157

[22] Filed: Jul. 26, 1977

[51] Int. Cl.² .............................................. B60N 1/10
[52] U.S. Cl. ....................................... 296/69; 297/63; 297/357
[58] Field of Search ...................... 296/66, 69; 297/62, 297/63, 357; 5/43

[56] References Cited
U.S. PATENT DOCUMENTS

| 1,894,103 | 1/1933 | Kuenzel | 296/69 |
| 3,550,949 | 12/1970 | Bonnaud | 296/69 |

*Primary Examiner*—Richard A. Bertsch

[57] ABSTRACT

A seat base unit and a seat back unit are pivotally supported on a vehicle body. The units are movable between seat-forming positions wherein the units comfortably accommodate passengers and load-carrying positions wherein they protectively close a load-carrying space. A foldable floor is interconnected with the seat base unit for movement between a stowed position when the units are in the seat-forming positions and a floor-forming position when the units are in the load-carrying positions. A spring is used for counterbalancing the weight of the units and the foldable floor and thereby to facilitate the movement of the units and the foldable floor between the respective positions thereof.

23 Claims, 13 Drawing Figures

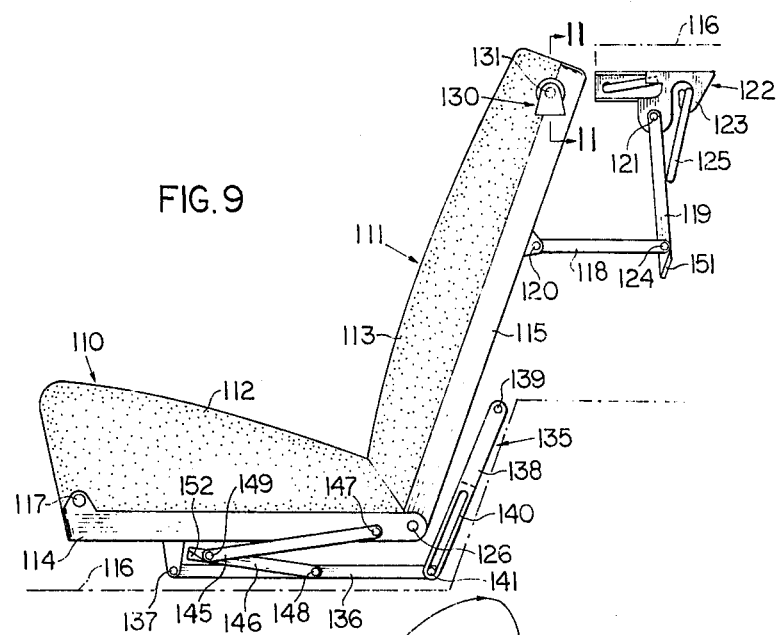

CONVERTIBLE SEAT OF A VEHICLE

BACKGROUND OF THE INVENTION

This invention relates to vehicle seats and more particularly to passenger seats which are convertible from a regular seat configuration to a load-carrying configuration.

The desirability of a convertible rear seat in passenger vehicles has been long recognized and vehicles wherein the seat back unit of the rear seat may be folded forward to a floor-forming position to create an enlarged cargo carrying space of the vehicle are well known. However, such arrangements generally have several disadvantages.

Vehicles with such arrangements may present a safety hazard. Any loose items in such cargo carrying space may impact the occupants of the front seats in the event of sudden deceleration, such as caused by an accident or hard breaking of the vehicle, since there usually is insufficient protective separation between the cargo carrying space and the occupants of the front seats.

Another disadvantage is that in vehicles of the described type the items carried in the cargo carrying space are exposed during unattended parking, unless the items are specifically covered. This may preclude leaving any items of value in the exposed cargo carrying space.

Another disadvantage is that items left in the described cargo carrying space may be exposed to intense heating by the sun through the vehicle's windows, particularly, during unattended parking of the vehicle.

SUMMARY OF THE INVENTION

The present invention overcomes the above stated disadvantages by providing a new and improved convertible seat comprising a seat base unit and a seat back unit.

The primary feature of the invention is that the units are movable between their seat-forming positions and their load-carrying positions, in which positions the units cooperate to comfortably accommodate passengers and to protectively close a load-carrying space, respectively. In the load-carrying positions of the units, the created load-carrying space is protectively enclosed providing complete protection to the occupants of the front seats from any loose items within the load-carrying space in the event of sudden deceleration. In passenger vehicles which are provided with regular trunk space, the load-carrying space communicates with the regular trunk space, both spaces being protectively enclosed. Furthermore, the upper edge of the seat back unit is situated at substantially the same level in either one of the seat-forming and the load-carrying positions of the seat back unit so that the contents of the combined load-carrying and trunk space are not exposed to outside view and to possible adverse effects due to heating by the sun through the vehicle's windows.

Another feature of the invention resides in the provision of unit supporting arrangements for supporting the seat base unit and the seat back unit on the vehicle body for movement between the respective seat-forming and load-carrying positions of the units. This feature is complemented by the provision of unit retaining means for positioning and maintaining the units in each of the respective positions.

Another feature of the invention resides in the provision of a foldable floor which is movable between a stowed position corresponding to the seat-forming positions of the units and a floor-forming position corresponding to the load-carrying positions of the units. In the floor-forming position, the foldable floor defines the floor of the load-carrying space at a predetermined suitable level with respect to the vehicle floor. The embodiments of the foldable floor described and illustrated in the drawing are for completely or partially interdependent movement with the units between the respective positions thereof, thereby requiring a minimum of manual operations for the conversion process of the convertible seat.

Another feature of the invention resides in combinations including spring means for facilitating the conversion effort by counterbalancing to some extent the weight of the convertible seat.

Another feature of the invention resides in combinations including the foldable floor and means for positioning and maintaining the foldable floor in the floor-forming and the stowed positions.

These and other features, advantages and purposes of the invention will become more fully apparent from the following descriptions and claims, and from the accompanying drawing.

BRIEF DESCRIPTION OF THE DRAWING

FIG. 9 is a side elevation view of another embodiment of the convertible seat with the seat base unit and the seat back unit in the seat-forming positions, and an embodiment of the foldable floor in the stowed position;

FIG. 10 is a side elevation view of the embodiments shown in FIG. 9 with the units in the load-carrying positions and the foldable floor in the floor-forming position;

DESCRIPTION OF THE PREFERRED EMBODIMENTS

Figure 1:
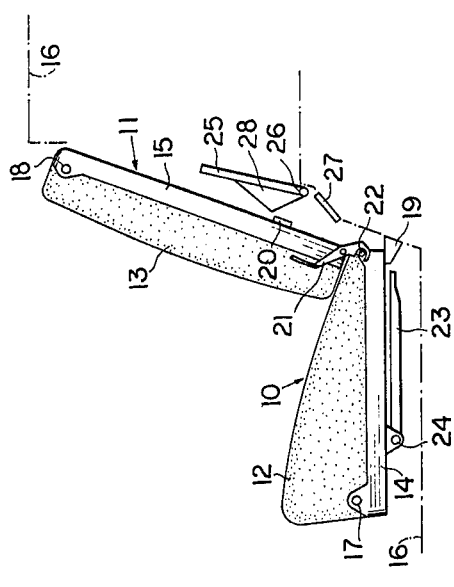
FIG. 1 is a side elevation view of an embodiment of the convertible seat with the seat base unit and the seat back unit in the seat-forming positions, and an embodiment of the foldable floor in the stowed position.

In FIG. 1, the convertible seat is shown in an embodiment with a seat base unit 10 and a seat back unit 11 in normal seat-forming positions. Seat cushions 12 and 13 are securely mounted on a rigid frame 14 of the unit 10 and on a rigid frame 15 of the unit 11, respectively. The unit 10 is supported on a vehicle body 16 by a pivot pin 17 pivotally connecting the frame 14 at the forward edge thereof to the vehicle body, so that the unit 10 is pivotable about a transverse axis of the vehicle body. The unit 11 is supported on the vehicle body 16 by a pivot pin 18 pivotally connecting the frame 15 at the upper edge thereof to the vehicle body, so that the unit 11 is pivotable about a transverse axis of the vehicle body. The pivot pins 17 and 18 are supported on the vehicle body 16 by conventional bearing means, not shown. The transverse axes represented by the pivot pins 17 and 18 are parallel to each other.

In the seat-forming positions, the seat base unit 10 rests on an abutment 19 which is rigidly affixed to the vehicle body 16 and the seat back unit 11 rests on an abutment 20 which is rigidly affixed to the side of the vehicle body 16. A latch arm 21 is rotatably supported on the lower part of the left lateral edge of the frame 15. The latch arm 21 is adapted to releasably engage a latch pin 22 which is protruding laterally from the rear part of the corresponding lateral side of the seat base frame 14. The latch arm 21 is spring biased to rotatably press against the latch pin 22 and maintain engagement therewith. Suitable stops, not shown, are provided to limit the rotatory motion of the latch arm 21 within suitable limits. The abutments 19 and 20, the latch arm 21 and the latch pin 22 cooperate to position and maintain the units 10 and 11 in the seat-forming positions.

A first floor portion 23 of a foldable floor is supported underneath the unit 10 by a pivot pin 24 pivotally connecting the front edge of the portion 23 to the frame 14, so that the floor portion 23 is pivotable about a transverse axis with respect to the seat base unit 10. A second floor portion 25 of the foldable floor is supported at a transverse edge of an elevated part of the vehicle floor rearward of the unit 10 by a pivot pin 26 pivotally connecting the rear edge of the floor portion 25 to the vehicle body, so that the floor portion 25 is pivotable about a transverse axis of the vehicle body. Conventional latch means, not shown, position and maintain the floor portions 23 and 25 in stowed positions as shown in FIG. 1 to permit positioning of the units 10 and 11 in the respective seat-forming positions.

Figure 2:
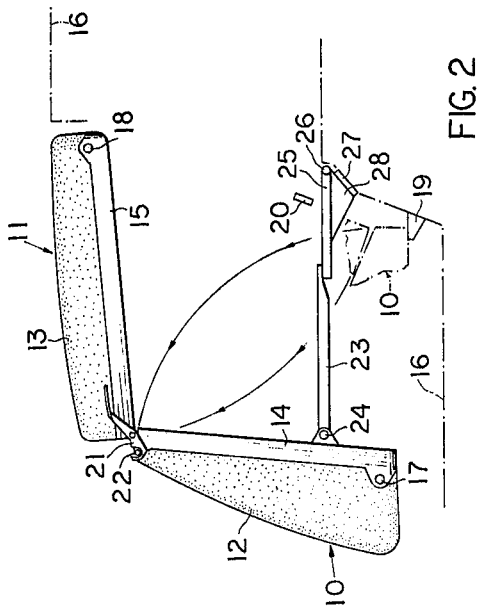
FIG. 2 is a side elevation view of the embodiments shown in FIG. 1 with the units in the load-carrying positions and the foldable floor in the floor-forming position.

Referring now to FIG. 2, the units 10 and 11 are shown rotated from the normal seat-forming to load-carrying positions, the rotatory motion of the rear edge of the unit 10 and the lower edge of the unit 11 being indicated by arrows. The rear edge of the unit 10 and the lower edge of the unit 11 are again adjacent to each other, as they were in the seat-forming positions of the units. The lower edge of the unit 11, having been rotated clockwise about the pivot pin 18, is resting now on the rear edge of the unit 10, which has been rotated counterclockwise about the pivot pin 17, with the latch arm 21 again engaging the latch pin 22 to position and maintain the units 10 and 11 in the respective load-carrying positions.

The floor portions 23 and 25 are shown in FIG. 2 rotated from the stowed positions to floor-forming positions with the portion 25 constituting a rearward coplanar extension of the portion 23 and the units being in the load-carrying positions. The floor portion 25, having been rotated counterclockwise about the pivot pin 26 to the floor-forming position, is positioned and maintained therein by a floor support abutment 27 which supports a bracket 28 integral with the floor portion 25. The rear edge of the floor portion 23 (the floor portion 23 having been rotated clockwise about the pivot pin 24 to the floor-forming position) rests on the front edge of the floor portion 25, which front edge positions and maintains the floor portion 23 in the floor-forming position.

A variation of the preferred embodiment of the foldable floor shown in FIGS. 1 and 2 may be achieved by having a first floor portion, in a floor forming position, rest against an abutment on the frame 14 and having the front edge of a second floor portion supported on the rear edge of the first floor portion.

Figure 3:
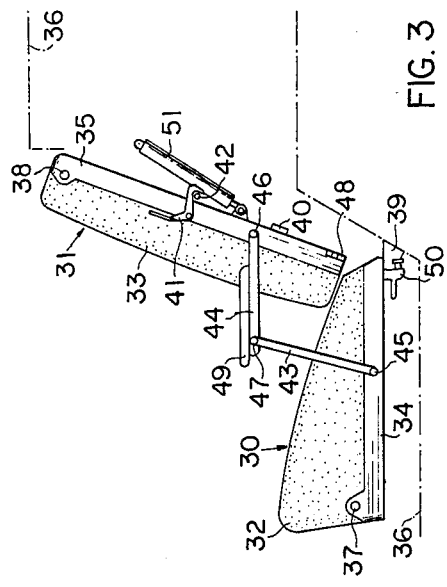
FIG. 3 is a side elevation view of another embodiment of the convertible seat with the seat base unit and the seat back unit in the seat-forming positions.
Figure 4:
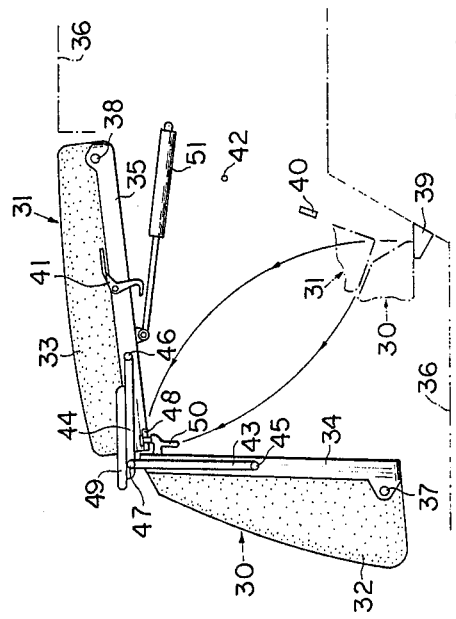
FIG. 4 is a side elevation view of the embodiment shown in FIG. 3 with the units in the load-carrying positions.

Another embodiment of the convertible seat is shown in FIGS. 3 and 4. In FIG. 3, the convertible seat is shown with a seat base unit 30 and a seat back unit 31 in normal seat-forming positions. Seat cushions 32 and 33 are securely mounted on a rigid frame 34 of the unit 30 and on a rigid frame 35 of the unit 31, respectively. The unit 30 is supported on a vehicle body 36 by a pivot pin 37 pivotally connecting the frame 34 at the forward edge thereof to the vehicle body, so that the unit 30 is pivotable about a transverse axis of the vehicle body. The unit 31 is supported on the vehicle body 36 by a pivot pin 38 pivotally connecting the frame 35 at the upper edge thereof to the vehicle body, so that the unit 31 is pivotable about a transverse axis of the vehicle body. The pivot pins 37 and 38 are supported on the vehicle body 36 by conventional bearing means, not shown. The transverse axes represented by the pivot pins 37 and 38 are parallel to each other.

In the seat-forming positions, the seat base unit 30 rests on an abutment 39 which is rigidly affixed to the vehicle body 36 and the seat back unit 31 rests on an abutment 40 which is rigidly affixed to the side of the vehicle body 36. A latch arm 41 is rotatably supported on the left lateral side of the frame 35. With the unit 31 in the seat-forming position, the latch arm 41 is adapted to releasably engage a latch pin 42 protruding laterally inwardly from the corresponding side of the vehicle body 36. The latch arm 41 is spring biased to rotatably press against the latch pin 42 and maintain engagement therewith. Suitable stops, not shown, are provided to limit the rotatory motion of the latch arm 41 within suitable limits. The abutments 39 and 40, the latch arm 41 and the latch pin 42 cooperate to position and maintain the units 30 and 31 in the seat-forming positions.

Referring now to FIG. 4, the units 30 and 31 are shown rotated from the normal seat-forming to load-carrying positions, the rotatory motion of the rear edge of the unit 30 and the lower edge of the unit 31 being indicated by arrows. The units 30 and 31 are interconnected by seat links 43 and 44 for interdependent movement of the units between the respective seat-forming and load-carrying positions which positions correspond to respective positions of the seat links 43 and 44. An arm rest 49 is rigidly mounted on the top of the seat link 44. The seat link 43 is pivotally connected to the left lateral side of the frame 34 by a pivot pin 45 and the seat link 44 is pivotally connected to the same lateral side of the frame 35 by a pivot pin 46, the links 43 and 44 being interconnected at a mutual pivotal connection by a pivot pin 47. When the units 30 and 31 are being moved from the seat-forming to the load-carrying positions, the unit 31 rotates clockwise about the pivot pin 38 with the unit 30 resting on the abutment 39 until a laterally protruding lug 48 rigidly affixed on the corresponding lateral side of the unit 31 stops the rotatory motion of the seat link 44 about the pivot pin 46. Thereafter the unit 31 continues to rotate clockwise about the pivot pin 38 and the unit 30 rotates counterclockwise about the pivot pin 37, the unit 30 being pulled by the seat link 43, since the link 44 is no longer continuing its rotatory motion about the pivot pin 46, the lug 48 now controlling the motion of the links 43 and 44. The units 30 and 31 are positioned and maintained in the load-carrying positions by a latch arm 50 releasably engaging the lug 48. A variation of the preferred embodiment shown in FIGS. 3 and 4 may be obtained by replacing the links 43 and 44 by a suitable cable.

A fluid spring 51, pivotally connected to the vehicle body 36 and to the frame 35, is urging the units to rotate in the direction of the load-carrying positions to counterbalance the weight of the convertible seat and thereby to facilitate the movement of the units 30 and 31 between the seat-forming and the load-carrying positions. The spring 51 is preferably a gas spring (as it is known in the art) because of its known advantages, such as small space requirements, or it may be any other spring means suitable for the purpose.

Figure 5:
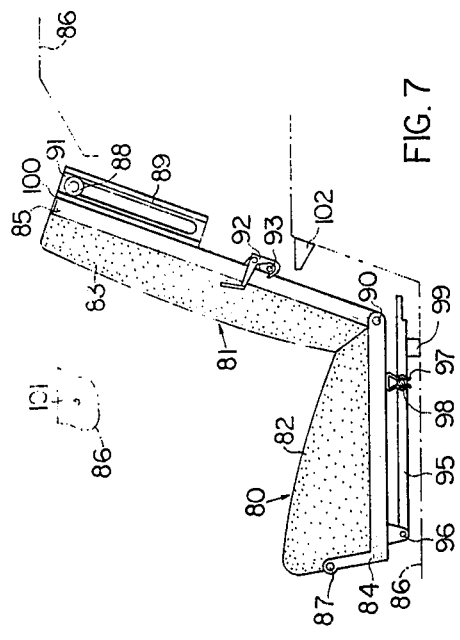
FIG. 5 is a side elevation view of another embodiment of the convertible seat with the seat base unit and the seat back unit in the seat-forming positions.
Figure 6:
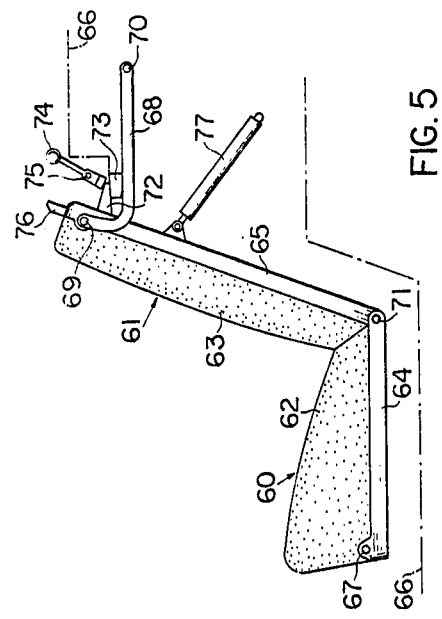
FIG. 6 is a side elevation view of the embodiment shown in FIG. 5 with the units in the load-carrying positions.

Another embodiment of the convertible seat is shown in FIGS. 5 and 6. In FIG. 5, the convertible seat is shown with a seat base unit 60 and a seat back unit 61 in normal seat-forming positions. Seat cushions 62 and 63 are securely mounted on a rigid frame 64 of the unit 60 and on a rigid frame 65 of the unit 61, respectively. The unit 60 is supported on a vehicle body 66 by a pivot pin 67 pivotally connecting the frame 64 at the forward edge thereof to the vehicle body, so that the unit 60 is pivotable about a transverse axis of the vehicle body. The pivot pin 67 is supported on the vehicle body 66 by conventional bearing means, not shown. The unit 61 is supported on the vehicle body 66 by a control arm 68 which is connected at one end thereof to the frame 65 by a pivot pin 69 and at the other end to the vehicle body 66 by a pivot pin 70. The pivot pin 69 represents an axis which is movable and transverse with respect to the vehicle body. The pivot pin 70 is supported on the vehicle body 66 by conventional bearing means, not shown, so that the control arm 68 is pivotable about the pivot pin 70 which represents a transverse axis of the vehicle body. The units 60 and 61 are pivotally interconnected by a pivot pin 71 whereby the units mutually support each other and are pivotable with respect to each other about the pivot pin 71 which represents a movable axis transverse with respect to the vehicle body. The transverse axes represented by the pivot pins 67, 69, 70 and 71 remain parallel to one another at all times. The units 60 and 61 are positioned and maintained in the seat-forming positions by an arrangement whereby a support bracket 72, rigidly affixed to the upper part of the frame 65 and extending rearwardly therefrom, rests on an abutment 73 which is rigidly affixed to the vehicle body 66, the support bracket 72 being retainingly engaged by a latch arm 74 which is pivotally supported on the vehicle body by a pivot pin 75. The latch arm 74 is spring biased to maintain engagement with the support bracket 72. Suitable stops, not shown, are provided to limit the rotatory motion of the latch arm 74 within suitable limits.

Referring now to FIG. 6, the units 60 and 61 are shown moved from the normal seat-forming to load-carrying positions, the motion of the pivotal interconnection of the units 60 and 61 at the pivot pin 71 and the motion of the pivotal connection at the pivot pin 69 being indicated by arrows. As the units 60 and 61 are moved from the seat-forming to the load-carrying positions, the pivotal interconnection at the pivot pin 71 moves counterclockwise in a circular arc about the pivot pin 67 and the pivotal connection at the pivot pin 69 moves reciprocally in a circular arc as the control arm 68 pivots about the pivot pin 70, the control arm moving from a position corresponding to the seat-forming positions of the units to a position corresponding to the load-carrying positions of the units. The units 60 and 61 are positioned and maintained in the load-carrying positions by an arrangement whereby a support bracket 76, rigidly affixed to the upper edge of the frame 65 and extending upwardly (in the seat-forming position of the unit 61), rests on the abutment 73, the support bracket 76 being retainingly engaged by the latch arm 74.

A fluid spring 77, of the same type as shown in FIGS. 3 and 4 and pivotally connected to the vehicle body 66 and to the frame 65, is urging the units to move in the direction of the load-carrying positions counterbalancing the weight of the convertible seat and thereby facilitating the movement of the units 60 and 61 between the seat-forming and the load-carrying positions. The spring 77 is preferably a gas spring or it may be any other spring means suitable for the purpose.

Figure 7:
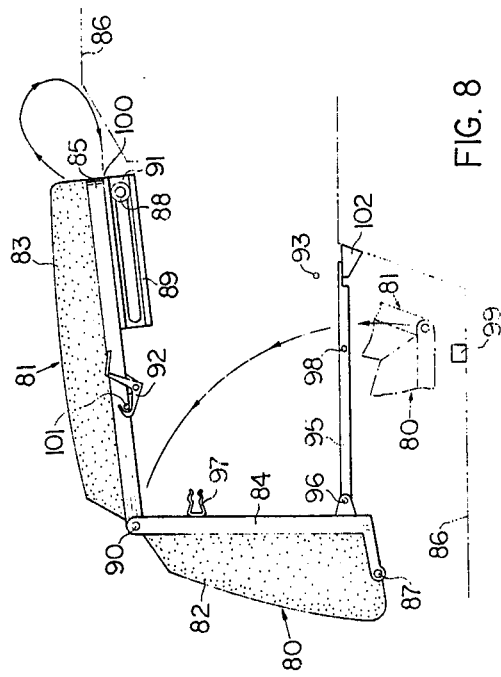
FIG. 7 is a side elevation view of another embodiment of the convertible seat with the seat base unit and the seat back unit in the seat-forming positions, and an embodiment of the foldable floor in the stowed position.
Figure 8:
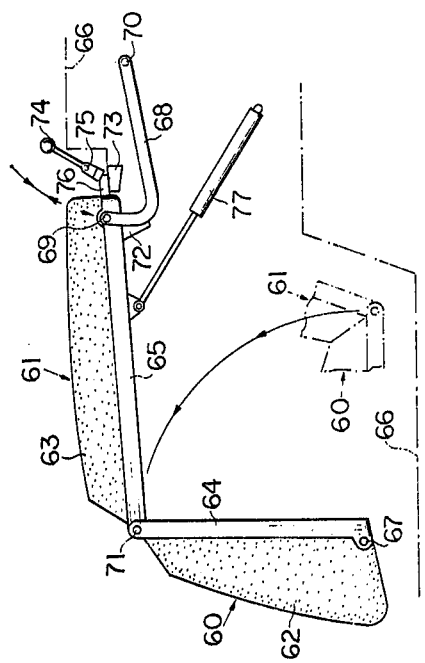
FIG. 8 is a side elevation view of the embodiments shown in FIG. 7 with the units in the load-carrying positions and the foldable floor in the floor-forming position.

Another embodiment of the convertible seat is shown in FIGS. 7 and 8. In FIG. 7, the convertible seat is shown with a seat base unit 80 and a seat back unit 81 in normal seat-forming positions. Seat cushions 82 and 83 are securely mounted on a rigid frame 84 of the unit 80 and on a rigid frame 85 of the unit 81, respectively. The unit 80 is supported on a vehicle body 86 by a pivot pin 87 pivotally connecting the frame 84 to the vehicle body, so that the unit 80 is pivotable about a transverse axis of the vehicle body. The pivot pin 87 is supported on the vehicle body 86 by conventional bearing means, not shown. The unit 81 is supported on the vehicle body 86 by an arrangement whereby a roller follower 88, supported on the vehicle body 86 by conventional bearing means, not shown, is guidingly received in a cam 89 rigidly affixed to the frame 85. The units 80 and 81 are pivotally interconnected to each other by a pivot pin 90 whereby the units mutually support each other and are pivotable with respect to each other about the pivot pin 90 which represents a movable transverse axis with respect to the vehicle body. The transverse axes represented by the pivot pins 87 and 90 and the roller follower 88 remain parallel to one another at all times. In the seat-forming positions of the units 80 and 81, the roller follower 88 rests against the upper end 91 of the cam 89. A latch arm 92, rotatably supported on the left lateral side of the frame 85, is adapted to releasably engage a latch pin 93 protruding laterally invardly from the corresponding side of the vehicle body 86, when the units 80 and 81 are in the seat-forming positions. The roller follower 88, the upper end 91 of the cam, the latch arm 92 and the latch pin 93 cooperate to position and maintain the units 80 and 81 in the respective seat-forming positions.

A foldable floor 95 is supported underneath the unit 80 by a pivot pin 96 pivotally connecting the front edge of the floor 95 to the frame 84, so that the floor 95 is pivotally about a transverse axis with respect to the unit 80. A catch 97, mounted on the underside of the frame 84, engages a laterally protruding pin 98 secured on the foldable floor 95 upon positioning of the units 80 and 81 in the seat-forming positions and the foldable floor 95 in a stowed position, the foldable floor having been dropped on an abutment 99 located on the vehicle floor. The catch 97, the pin 98 and the abutment 99 cooperate to position and maintain the foldable floor 95 in the stowed position.

Refering now to FIG. 8, the units 80 and 81 are shown moved from the normal seat-forming to load-carrying positions, the motion of the pivotal interconnection of the units 80 and 81 at the pivot pin 90 and the motion of a corner point 100 at the upper end of the frame 85 being indicated by arrows. As the units 80 and 81 are moved from the seat-forming to the load-carrying positions, the pivotal interconnection at the pivot pin 90 moves in a circular arc about the pivot pin 87 and the corner point 100 moves in a loop, the cam 89 being guided by the rooler follower 88. In the load-carrying positions of the units 80 and 81, the roller follower 88 again rests against the upper end 91 of the cam 89. The latch arm 92 is now engaging a latch pin 101 protruding laterally inwardly from the corresponding side of the vehicle body 86. The latch arm 92 is spring biased to maintain engagement with the latch pin 93 when the units 80 and 81 are in the seat-forming positions and to maintain engagement with the latch pin 101 when the units are in the load-carrying positions. The roller follower 88, the upper end 91 of the cam 89, the latch arm 92 and the latch pin 101 cooperate to position and maintain the units 80 and 81 in the load-carrying positions.

The foldable floor 95 is shown in FIG. 8 rotated from the stowed position to a floor-forming position when the units 80 and 81 are in the load-carrying positions. When the units 80 and 81 are moved from the seat-forming to the load-forming positions, the foldable floor 95 is carried with the unit 80 by the catch 97 until the lower part of the frame 85 encounters the read edge of the floor 95 forcing the pin 98 out of the catch 97. Thereafter the foldable floor 95 rotates counterclockwise about the pivot pin 96 due to gravity until the rear edge of the foldable floor drops on the abutment 102 which positions and maintains the foldable floor in the floor-forming position. The preferred utilization of the frame 85 to force the pin 98 out of the catch 97 may be replaced by the use of a cable of suitable length, the cable connecting the foldable floor 95 to the vehicle floor so that when the unit 80 with the foldable floor is rotated about the pivot pin 87 from the seat-forming to the load-carrying position the cable arrests the motion of the foldable floor at a suitable instant and thereby forces the pin 98 out of the catch 97. The preferred embodiment of the foldable floor 95 may be modified by pivoting the rear edge of a foldable floor on the vehicle body 86 instead of pivoting the front edge of same on the frame 84. Variations of the preferred embodiment shown in FIGS. 7 and 8 may be obtained by mounting the roller follower on the seat back unit and the cam on the vehicle body. In another variation a combination of a roller follower and a cam may be employed to support a seat base unit and pivot pin to support a seat back unit for movement of the units between seat-forming and load-carrying positions.

Another embodiment of the convertible seat is shown in FIGS. 9 and 10. In FIG. 9, the convertible seat is shown with a seat base unit 110 and a seat back unit 111 in normal seat-forming positions. Seat cushions 112 and 113 are securely mounted on a rigid frame 114 of the unit 110 and on a rigid frame 115 of the unit 111, respectively. The unit 110 is supported on a vehicle body 116 by a pivot pin 117 pivotally connecting the frame 114 at the forward edge thereof to the vehicle body so that the unit 110 is pivotable about a transverse axis of the vehicle body. The pivot pin 117 is supported on the vehicle body 116 by conventional bearing means, not shown. The units 110 and 111 are interconnected to each other by a pivot pin 126 whereby the units mutually support each other and are pivotable with respect to each other, the pin 126 representing a movable axis transverse with respect to the vehicle body. The unit 111 is supported on the vehicle body 116 by an arrangement including a first control link 118 and a second control link 119. The link 118 is connected to the frame 115 by a pivot pin 120. The link 119 is connected by a pivot pin 121 to an endplate 123 of a conventional double torsion bar assembly 122 mounted transversely on the vehicle body 116, the assembly 122 being rearward of and adjacent to the upper part of the unit 111. (Such torsion bar assemblies are commonly used, for example, for counterbalancing automobile trunk lids.) The control links 118 and 119 are interconnected at a mutual pivotal connection by a pivot pin 124. The pivotal end 125 of one of the torsion bars, acting as a spring, is urging the control link 119 to rotate clockwise about the pivot pin 121. The transverse axes represented by the pivot pins 117, 120, 121, 124 and 126 remain parallel to one another at all times.

A first floor portion 136 of a foldable floor 135 is supported underneath the unit 110 by a pivot pin 137 pivotally connecting the front edge of the portion 136 to the frame 114 so that the portion 136 is pivotable about a transverse axis with respect to the unit 110. A second floor portion 138 of the foldable floor 135 is supported at a transverse edge of an elevated part of the vehicle floor rearward of the unit 110 and the portion 136 by a pivot pin 139 pivotally connecting the rear edge of the floor portion 138 to the vehicle body 116, so that the floor portion 138 is pivotable about a transverse axis of the vehicle body. The pivot pin 139 is supported on the vehicle body 116 by conventional bearing means, not shown. A slotted guiding and retaining bar 140 is extending forwardly from the left lateral edge of the floor portion 138, the bar 140 being rigidly attached thereto. The bar 140 receives a follower pin 141 protruding laterally outwardly from the corresponding lateral edge of the floor portion 136, the bar 140 and the pin 141 positioning and maintaining the floor portions 136 and 138 in the respective stowed positions. A retaining link 145 is pivotally connected to the frame 114 by a pivot pin 147 and a retaining link 146 is pivotally connected to the floor portion 136 by a pivot pin 148. The links 145 and 146 are interconnected at a mutual pivotal connection by a pivot pin 149 and are in folded positions when the units 110 and 111 are in the seat-forming positions.

Refering now to FIG. 10, the units 110 and 111 are shown moved from the normal seat-forming to load-carrying positions, the rotatory motion of the pivotal interconnection of the units 110 and 111 at the pivot pin 126 and the motion of a connection point on the unit 111 at a retaining pin 131 being indicated by arrows. As the units 110 and 111 are moved from the seat-forming to the load-carrying positions, the interconnection at the pivot pin 126 moves in a circular arc about the pivot pin 117 and the connection point on the unit 111 at the retaining pin 131 moves in a loop which is controlled by the likage comprising the control links 118 and 119, the control links moving from respective positions corresponding to the seat-forming positions of the units to respective positions corresponding to the load-carrying positions of the units. The first part of the loop is a circular arc, as the units 110 and 111 first rotate conjointly counterclockwise about the pivot pin 117, the units abutting against each other at the interconnection thereof, and the control links 118 and 119 pivoting about the respective pivot pins 120, 121 and 124 until a lug 151 protruding laterally from the interconnected end of the link 119 encounters the link 118 and stops the pivotal motion of the links 118 and 119 about the pivot pin 124. Thereafter the unit 110 continues to rotate counterclockwise about the pivot pin 117 and the unit 111 rotates clockwise with respect to the pivot pin 126, the mutual pivotal connection of the links 118 and 119 at the pivot pin 124 being in a stationary state and the links 118 and 119 pivoting as a unit about the pivot pin 121 first clockwise and then counterclockwise until the units 110 and 111 are in the respective load-carrying positions. During the clockwise motion of the links 118 and 119, the pivotal end 125 is causing the units 110 and 111 to be urged in the direction of the load-carrying positions, but during the counterclockwise motion of same, the pivotal end 125 is opposing the motion of the units toward the same positions. The units 110 and 111 are positioned and maintained in the alternative seat-forming and load-carrying positions by a retaining pin assembly 130 comprising the retaining pin 131 and being mounted on the vehicle body 116 with the retaining pin being transverse with respect to the vehicle body. As the units 110 and 111 are being moved from the seat-forming to the load-carrying positions, the retaining links 145 and 146 pivot about the pivot pins 147 and 148, respectively, with both links 145 and 146 pivoting about the pivot pin 149 as the links are moving from the folded to extended positions and carrying the floor portions 136 and 138 from the stowed to the floor-forming positions, the follower pin 141 sliding within the bar 140 and carrying therewith the portion 138 to the floor-forming position wherein the portion 138 constitutes a rearward coplanar extension of the portion 136. The links 145 and 146 are prevented from fully extending by a lug 152 protruding laterally from the interconnected end of the link 146 to assure folding of the links 145 and 146 in the desired direction when the units 110 and 111 are moved from the load-carrying to the seat-forming positions. The links 145, 146, the bar 140 and the pin 141 cooperate to position and maintain the foldable floor 135 in the floor-forming position. The preferred links 145 and 146 may be replaced by a cable, if desired, or they may be replaced by an abutment on the frame 114, the abutment supporting a first floor portion in a floor-forming position. Under special geometrical conditions, the mutual interconnection comprising the bar 140 and the pin 141 may be replaced by a regular pivotal interconnection.

Figure 11:
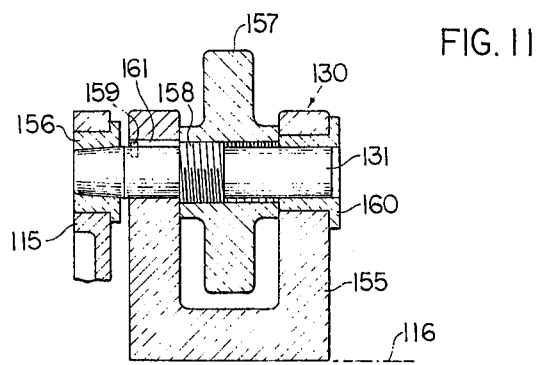
FIG. 11 is a cross sectional view of a retaining pin assembly taken along the line 11—11 of FIG. 9.

The retaining pin 131 is axially movable in a support 155 to engage a rubber-like bushing 156 secured in the lateral side of the frame 115, as seen in FIG. 11, when the units 110 and 111 are alternatively in the seat-forming and the load-carrying positions. The bushing and the engaging end of the pin 131 are correspondingly slightly tapered to assure close fit therebetween. The pin 131 is axialy movable by turning an internally threaded wheel 157, the threads of which are engaging a correspondingly threaded part 158 of the pin 131. A pin 159 secured on the periphery of the pin 131 and received in an axial groove 161 in the support 155 prevents the pin 131 from turning. A bushing 160 secured on the support 155 permits the insertion of the pin 131 in the support 155.

Because of symmetry with respect to both sides of the convertible seat, only the unit support means supporting the units on the left side of the vehicle body and the connecting means interconnecting the units on the left side have been described hereinbefore. The same applies to the foor support means for supporting the foldable floor and the means for interconnecting the floor portions. It is apparent, however, that any number of subcombinations such as the connecting means comprising the seat links or the unit support means comprising the control arm or the control links may be provided to obtain any degree of control desired. The same applies to the unit retaining means and to the floor retaining means for positioning and maintaining the units and the foldable floor, respectively, in the respective positions.

The latch means described herein for positioning and maintaining the units are presented as examples, since there are other latch means known in the art, which means are suitable or may be adapted for use in this invention.

Figure 12:
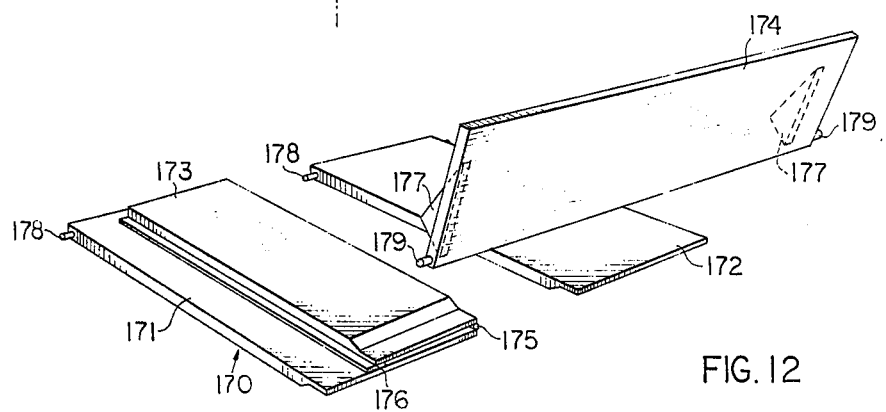
FIG. 12 is a perspective view of an embodiment of the foldable floor having a middle section, the foldable floor with the middle section being in the stowed positions.
Figure 13:
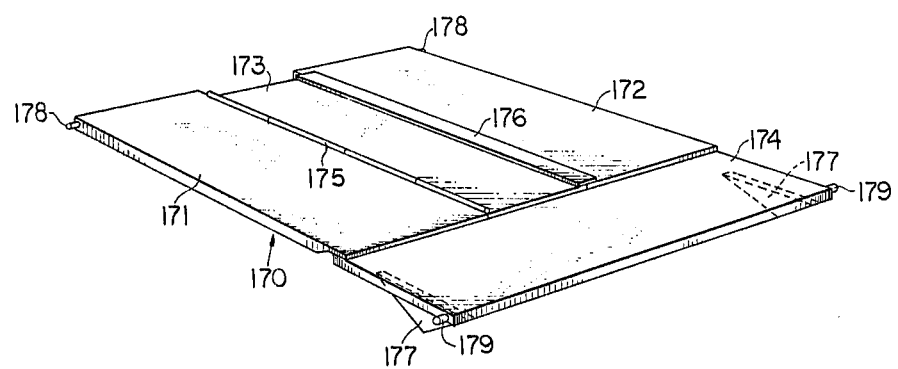
FIG. 13 is a perspective view of the embodiment of the foldable floor shown in FIG. 12 in the floor-forming position.

For vehicles having a conventional drive shaft tunnel in the floor of the vehicle body, a foldable floor may be modified to accommodate such tunnel. Accordingly, a middle section 173 of a foldable floor may be provided as shown in FIGS. 12 and 13. The foldable floor shown in FIGS. 12 and 13 is similar to the foldable floor shown in FIGS. 1 and 2, except that a first floor portion 170 comprises a left floor section 171, a right floor section 172 and the middle section 173 longitudinally hinged by a hinge 175 on the left floor section 171. A second floor portion 174 is generally the same as the corresponding portion 25 shown in FIGS. 1 and 2. In a stowed position, shown in FIG. 12, the middle section 173 is folded on the top of the left floor section 171 lying face to face therewith to provide an opening in the portion 170 for accommodating a drive shaft tunnel. In a floor-forming position, shown in FIG. 13, the middle section 173, after being rotated about the hinge 175, is coplanar with the sections 171 and 172. The middle section 173 is positioned and maintained in the floor-forming position by a retaing flange 176 rigidly affixed to the longitudinal right edge of the section 173 and resting on the left longitudinal edge of the section 172. Brackets 177, corresponding to the brackets 27 of FIGS. 1 and 2, are rigidly affixed to the lower surface of the portion 174 to position and maintain the portion 174 in the floor-forming position. In the floor-forming position of the foldable floor, the rear edge of the portion 170 is supported on the front edge of the portion 174. Pivot pins 178 pivotally connect the portion 170 to a seat back unit, not shown, and pivot pins 179 pivotally connect the portion 174 to the vehicle body, not shown, in a similar relationship as shown in FIGS. 1 and 2. It will, of course, be apparent that similar middle sections may be provided on the foldable floors shown in FIGS. 7 and 8, and in FIGS. 9 and 10.

The seat base unit and the seat back unit, in the load-carrying positions constitute a forward wall of the load-carrying space and a cover of the same space, respectively, with the foldable floor in the floor-forming position defining the floor of the same space, the sides of the vehicle body defining the lateral extension of the same space and the open rearward side of the space providing access thereto. In case the convertible seat does not include a foldable floor, the vehicle floor portion directly under the units in the load-carrying positions defines the floor of the load-carrying space.

The exact desired load-carrying positions of the seat base unit and the seat back unit may be obtained by geometrically determining the vertical-longitudinal locations of the unit support means (pivot pins, where applicable) with respect to the units and the vehicle body.

The movement of the convertible seat has been described as it occurs when the units are moved from the seat-forming to the load-carrying positions. The reverse sequence of events occurs when the units are moved from the load-carrying to the seat-forming positions.

It will be understood that the provision of the foldable floor and the spring means for urging the units is not limited to the particular preferred embodiments of the convertible seat with which the foldable floor and the spring means are associated as disclosed herein, but may be included, substituted or adapted in any of the other herein disclosed embodiments of the convertible seat, if desired. Furthermore, in embodiments of the convertible seat such as shown in FIGS. 5 and 6, and FIGS. 7 and 8, the spring means for urging the units may be connected to the seat base unit instead of the seat back unit, if desired. For completely unassisted operation, the springs 51 and 77 employed in the preferred embodiments of FIGS. 3 and 4, and FIGS. 5 and 6, respectively, may be eliminated if desired.

It will be understood that other modifications may be made within the spirit of the invention. It is intended that no limitations be placed on the invention except as defined by the scope of the following claims.

I claim:

1. In a vehicle body, a convertible seat comprising a seat base unit having a seat-forming position and a load-carrying position, a seat back unit having a seat-forming position and a load-carrying position, first unit support means and second unit support means for supporting the seat base unit and the seat back unit, respectively, on the vehicle body, said units cooperating in the respective load-carrying positions to protectively close a load-carrying space and cooperating in the respective seat-forming positions to comfortably accomodate passengers, the first unit support means supporting the seat base unit for movement of the seat base unit between the seat-forming and the load-carrying positions thereof, the second unit support means supporting the seat back unit for movement of the seat back unit between the seat-forming and the load-carrying positions thereof, the seat base unit constituting in the load-carrying position thereof a forward wall protectively closing the front of the load-carrying space, the seat back unit constituting in the load-carrying position thereof a cover protectively closing the top of the load-carrying space, the upper edge of the seat back unit being at substantially the same level in either one of the seat-forming and the load-carrying positions of the seat back unit, and unit retaining means for positioning and maintaining said units in each of the respective seat-forming and load-carrying positions thereof.

2. Apparatus as claimed in claim 1 including a foldable floor having a stowed position when said units are in the respective seat-forming positions thereof and a floor-forming position when said units are in the respective load-carrying positions thereof, the foldable floor constituting in the floor-forming position the floor of said load-carrying space, floor support means supporting the foldable floor for movement with respect to said units and the vehicle body between the stowed and the floor-forming positions of the foldable floor, and floor retaining means for positioning and maintaining the foldable floor in either one of the stowed and the floor-forming positions thereof.

3. Apparatus as claimed in claim 2 wherein the floor support means comprises a pivotal connection connecting the front edge of the foldable floor to the seat base unit and the floor retaining means includes a floor support abutment on the vehicle body for positioning and maintaining the foldable floor in the floor-forming position thereof.

4. Apparatus as claimed in claim 2 wherein the foldable floor has a middle section supported thereon for movement of the middle section between a stowed position corresponding to the stowed position of the foldable floor and a floor-forming position corresponding to the floor-forming position of the foldable floor.

5. Apparatus as claimed in claim 2 wherein the foldable floor comprises a first floor portion and a second floor portion, said floor portions having respective stowed positions corresponding to the stowed position of the foldable floor and respective floor-forming positions corresponding to the floor-forming position of the foldable floor, the second floor portion constituting a coplanar extension of the first floor portion when said floor portions are in the respective floor-forming positions thereof, said floor portions being movable with respect to each other between the respective stowed and floor-forming positions thereof.

6. Apparatus as claimed in claim 5 wherein the floor support means includes a pivotal connection connecting the front edge of the first floor portion to the seat base unit and another pivotal connection connecting the rear edge of the second floor portion to the vehicle body.

7. Apparatus as claimed in claim 6 wherein the floor retaining means includes a floor support abutment on the vehicle body, the floor support abutment supporting the second floor portion and the front edge of the second floor portion supporting the rear edge of the first floor portion, when the foldable floor is in the floor-forming position thereof.

8. Apparatus as claimed in claim 6 wherein said floor portions have a mutual interconnection for interdependent movement of said floor portions between the respective stowed and floor-forming positions thereof.

9. Apparatus as claimed claim 8 wherein said mutual interconnection comprises a supporting follower and a guiding and retaining bar disposed on the first and the second floor portions, the supporting follower being interlocked with the guiding and retaining bar so that there is guided relative motion of the supporting follower with respect to the guiding and retaining bar when the foldable floor is moved between the stowed and the floor-forming positions thereof.

10. Apparatus as claimed in claim 5 wherein the first floor portion has a middle section supported thereon for movement of the middle section between a stowed position corresponding to the stowed position of the foldable floor and a floor-forming position corresponding to the floor-forming position of the foldable floor.

11. Apparatus as claimed in claim 2 wherein the floor support means comprises a pivotal connection connecting the front edge of the foldable floor to the seat base unit and the floor retaining means includes a first retaining link and a second retaining link, the first retaining link having a pivotal connection to one of said units, the second retaining link having a pivotal connection to the foldable floor, said retaining links being interconnected at a mutual pivotal connection and being movable about the respective pivotal connections between respective folded positions corresponding to the stowed position of the foldable floor and respective extended positions corresponding to the floor-forming position of the foldable floor.

12. Apparatus as claimed in claim 1 wherein the first unit support means comprises a pivotal connection connecting the seat base unit to the vehicle body and the second unit support means comprises another pivotal connection connecting the seat back unit to the vehicle body.

13. Apparatus as claimed in claim 12 wherein the unit retaining means comprises latch means on the seat base unit and on the seat back unit, and unit support abutments on the vehicle body, the latch means and the unit support abutments cooperating to position and maintain said units in either one of the respective seat-forming and load-carrying positions thereof.

14. Apparatus as claimed in claim 1 including connecting means interconnecting said units for mutual support and interdependent movement of said units between the respective seat-forming and load-carrying positions thereof.

15. Apparatus as claimed in claim 14 wherein the first unit support means comprises a pivotal connection connecting the seat base unit to the vehicle body and the second unit support means comprises another pivotal connection connecting the seat back unit to the vehicle body.

16. Apparatus as claimed in claim 15 wherein the connecting means comprises a first seat link and a second seat link, the first seat link having a pivotal connection to the seat base unit, the second seat link having a pivotal connection to the seat back unit, said seat links being interconnected at a mutual pivotal connection and being movable about the respective pivotal connections thereof between respective positions corresponding to the seat-forming positions of said units and respective positions corresponding to the load-carrying positions of said units, and means for controlling motion of said seat links about the respective pivotal connections thereof to aid in said interdependent movement of said units.

17. Apparatus as claimed in claim 14 wherein said connecting means comprises a pivotal interconnection.

18. Apparatus as claimed in claim 17 wherein the first unit support means comprises a pivotal connection connecting the seat base unit to the vehicle body and the second unit support means comprises a control arm having at one end thereof a pivotal connection to the seat back unit and at the other end a pivotal connection to the vehicle body for movement of the control arm between a position corresponding to the seat-forming positions of said units and a position corresponding to the load-carrying positions of said units.

19. Apparatus as claimed in claim 17 wherein the first unit support means comprises a pivotal connection connecting the seat base unit to the vehicle body and the second unit support means comprises a first control link and a second control link, the first control link having a pivotal connection to the seat back unit, the second control link having a pivotal connection to the vehicle body, the control links being interconnected at a mutual pivotal connection and being movable about the respective pivotal connections thereof between respective positions corresponding to the seat-forming positions of said units and respective positions corresponding to the load-carrying positions of said units, said mutual pivotal connection of the control links being in a stationary state with said units in the load-carrying positions thereof, means for effecting said stationary state, and spring means for causing said units to be urged to move about the respective pivotal connections of said units to aid in movement of said units between the respective seat-forming and load-carrying positions thereof.

20. Apparatus as claimed in claim 17 wherein the unit retaining means comprises retaining pin means on the seat back unit and on the vehicle body for releasably securing the seat back unit to the vehicle body.

21. Apparatus as claimed in claim 17 wherein the unit retaining means includes latch means on one of said units and on the vehicle body.

22. Apparatus as claimed in claim 17 wherein one of the unit support means comprises a cam element and a follower element and the other of the unit support means comprises a pivotal connection connecting the associated unit to the vehicle body, one of said elements being mounted on the vehicle body and the other of said elements being mounted on the unit associated with said one of the unit support means, said elements being interlocked so that there is guided relative motion of said elements with respect to each other during movement of said units between the respective seat-forming and load-carrying positions thereof.

23. Apparatus as claimed in claim 1 including spring means for causing at least one of said units to be urged to move about the respective unit support means so that movement of at least one of said units between the respective seat-forming and load-carrying positions is facilitated.

* * * * *